United States Patent

Purdue

[11] Patent Number: 6,162,975
[45] Date of Patent: Dec. 19, 2000

[54] METHOD AND APPARATUS FOR MAKING TROMBONE SLIDE POSITIONS

[76] Inventor: Kelly Ray Purdue, 1731 Dolphin Avenue, Kelowna BC, Canada, V1Y 8A6

[21] Appl. No.: 09/046,770

[22] Filed: Mar. 24, 1998

Related U.S. Application Data

[60] Provisional application No. 60/042,393, Mar. 25, 1997.

[51] Int. Cl.[7] .................................................. G10D 7/10
[52] U.S. Cl. .............................. 84/395; 84/387 R; 84/453
[58] Field of Search .................. 84/387 R, 395, 84/453, 470 R, 477 R

[56] References Cited

U.S. PATENT DOCUMENTS

| | | | |
|---|---|---|---|
| 2,446,378 | 8/1948 | Maxwell | 84/397 |
| 3,456,062 | 7/1969 | Watson et al. | 84/1.01 |
| 3,895,555 | 7/1975 | Peterson et al. | 84/470 |
| 4,286,495 | 9/1981 | Roof | 84/485 R |

FOREIGN PATENT DOCUMENTS 10-116068  5/1998  Japan .

*Primary Examiner*—Robert E. Nappi
*Assistant Examiner*—Kim Lockett
*Attorney, Agent, or Firm*—Antony C. Edwards

[57] ABSTRACT

An apparatus for marking slide positions on a conventional trombone having an inner hollow slide slidingly journalled in an outer hollow slide includes a magnet sensor mountable on the outer hollow slide for sensing proximity of a magnet mounted within the inner hollow slide. The magnet sensor may be first magnets mountable in longitudinally spaced apart slide positions on the outer hollow slide. A second magnet is mountable within the inner hollow slide. The magnet sensor indicates the proximity of the second magnet by feedback to a user sliding the outer hollow slide over the inner hollow slide.

8 Claims, 4 Drawing Sheets

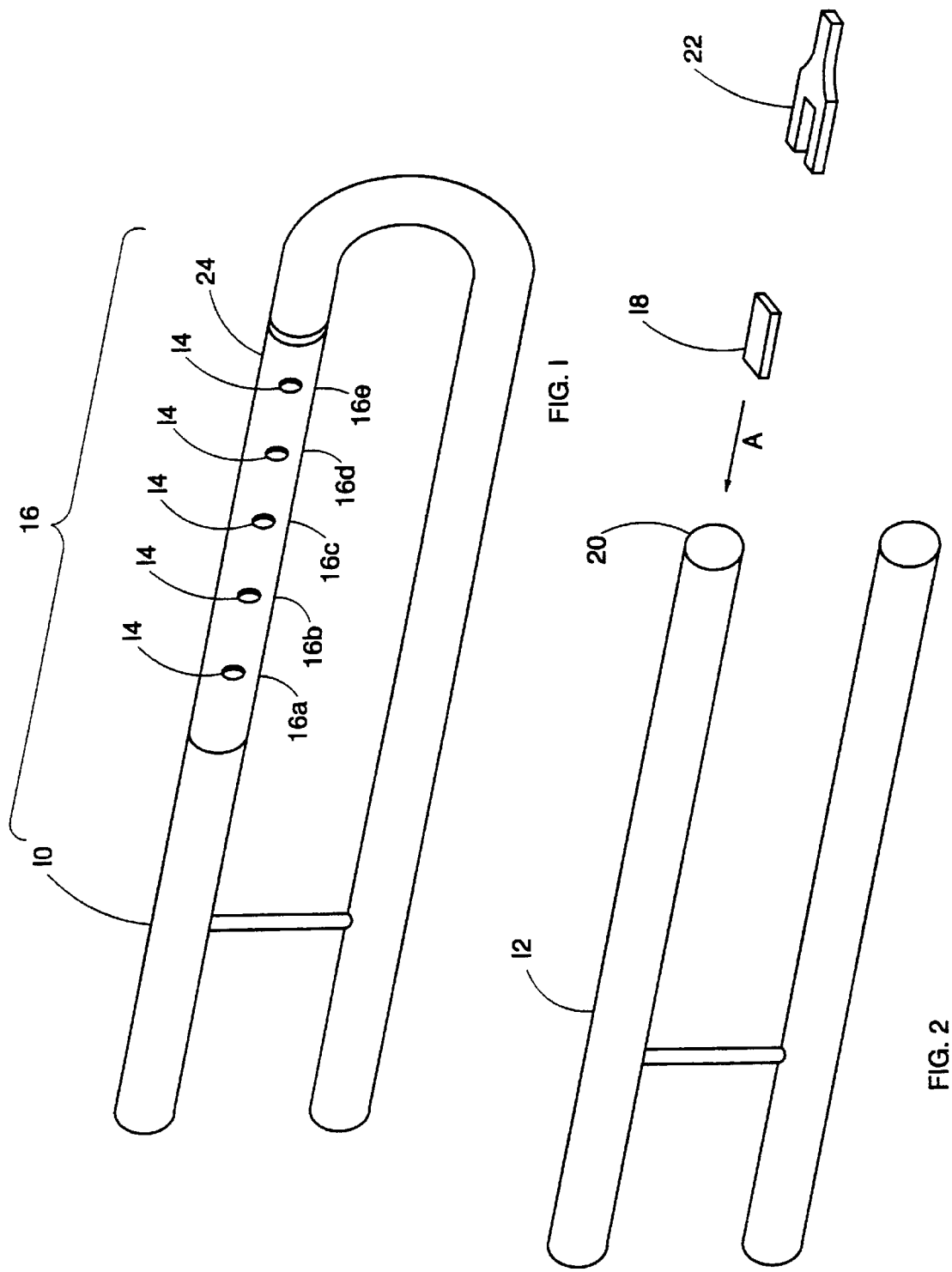

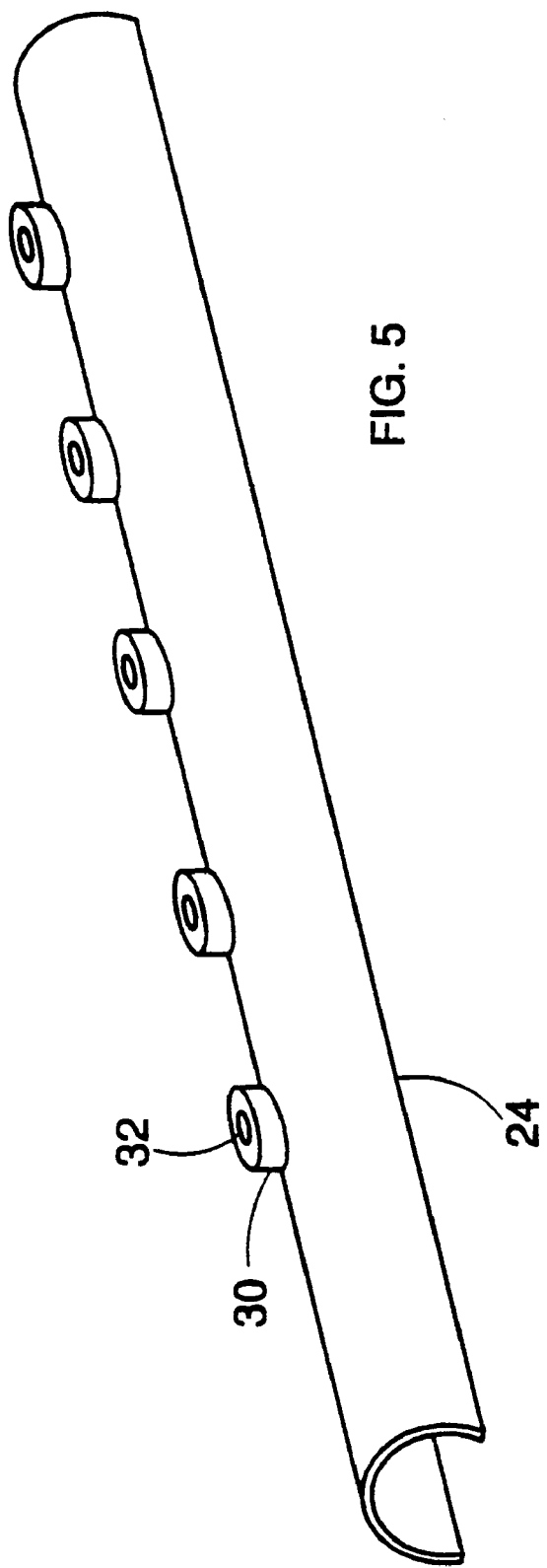

6,162,975

METHOD AND APPARATUS FOR MAKING TROMBONE SLIDE POSITIONS

CROSS REFERENCE TO RELATED APPLICATION

This application claims priority from United States Provisional Patent Application No. 60/042,393 filed Mar. 25, 1997 titled Method And Apparatus For Marking Trombone Slide Positions.

FIELD OF THE INVENTION

This invention relates to the field of training implements for teaching the correct playing of a musical instrument, and in particular relates to such implements in relation to trombones.

BACKGROUND OF THE INVENTION

It is generally well known that a trombone is a difficult instrument to learn to play well, at least for beginner students. This is because the trombone slide lacks discreet positions or positioning indicators to assist a student in correctly positioning the trombone slide for a particular note.

Consequently, it is an object of the present invention to provide a means for providing students learning to play the trombone with discreet slide positioning markers. In particular, it is an object of the present invention to provide trombone slide positioning markers which provide tactile feedback to a student sliding a trombone outer slide over the corresponding trombone inner slide journalled therein.

It is an object of the present invention to provide a method and apparatus for marking trombone slide positions so that a student by exercises to improve muscle memory, will return the trombone slide to the same relative slide positions without the student initiating a note with the slide poorly positioned and then pulling the slide so as to sharpen the initially poorly supported note, and to thereby encourage the student to learn proper breath support to produce a full, in tune note, the student further developing thereby a good sense of relative pitch required of a trombone player because of the infinite variability.

SUMMARY OF THE INVENTION

An apparatus for marking slide positions on a conventional trombone having an inner hollow slide slidingly journalled in an outer hollow slide includes magnet sensing means mountable on the outer hollow sleeve for sensing proximity of a magnet mounted within the inner hollow slide. The magnet sensing means are mountable in longitudinally spaced apart slide positions on the outer hollow sleeve. A magnet is mountable within the inner hollow slide and positionable so as to register the proximity of the magnet to the magnet sensing means by feedback to a user sliding the outer hollow sleeve over the inner hollow sleeve.

In the method of the present invention for marking slide positions on a trombone having an inner hollow slide slidingly journalled in an outer hollow slide, the method includes the steps of:

a) mounting or releasably securing on said outer hollow sleeve magnet sensing means for sensing the proximity of a magnet mounted or releasably secured within said inner hollow slide, said magnet sensing means mounted or releasably secured in longitudinally spaced apart slide positions on said outer hollow sleeve;

b) mounting or releasably securing a magnet within the inner hollow slide, the magnet positioned so as to register proximity of the magnet to the magnet sensing means by feedback to a user sliding the outer hollow sleeve over the inner hollow sleeve.

Advantageously, the magnet sensing means are magnets or magnetic reed switches electrically cooperating with, for example, light emitting diodes. Further advantageously, the feedback to the user are tactile cues as a result of proximity of the magnet to the longitudinally spaced apart array of magnets comprising the magnet sensing means.

In one aspect of the present invention, the magnet sensing means, being in a preferred embodiment, a longitudinally spaced apart array of magnets, are mountable onto the outer hollow slide by a sleeve onto which are mounted the magnets. The magnet mountable within the inner hollow slide may be releasably secured by a clip which, in one preferred embodiment, is in the form of a double pronged fork, where the magnet is mountable in a friction fit between the forks, and the forks sized to snugly slide for a friction fit within the inner hollow slide.

BRIEF DESCRIPTION OF THE DRAWINGS

FIG. 1 is, in perspective view, a trombone outer slide having the slide position markers of the present invention mounted thereon.

FIG. 2 is, in perspective view, a trombone inner slide showing, in exploded view, the cooperating trombone slide position marker and mounting means of the present invention.

FIG. 5 is, in perspective view, the sleeve of FIG. 1 in an alternative embodiment.

DETAILED DESCRIPTION OF THE PREFERRED EMBODIMENTS

Figure 1A:
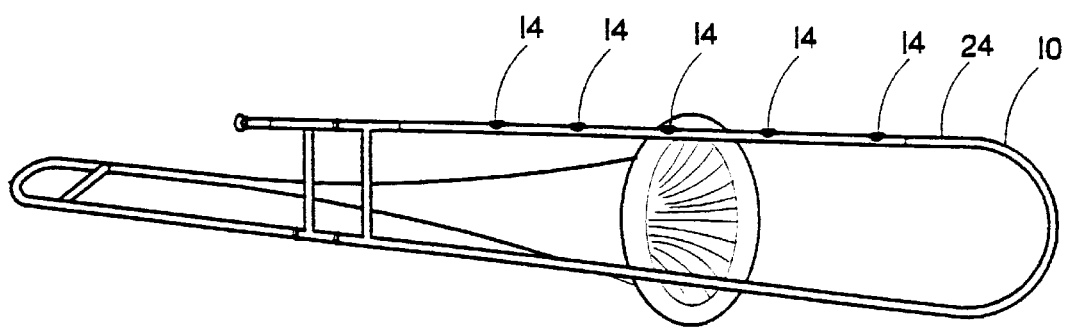
FIG. 1a is, in perspective view, a trombone having the slide position markers of the present invention mounted thereon.

Trombone slide positions are taught through repetitive exercise to build muscle memory in the student. Trombone exercises entail repetitive sliding of outer slide 10, as seen in FIG. 1 and 1a over inner slide 12, seen in FIG. 2, where inner slide 12 is slidably journalled within corresponding snug mating cavities in outer slide 10.

In one embodiment, outer magnets 14 are mounted, or releasably mounted, at discreet slide positions 16a, 16b, 16c, 16d and 16e, it being understood that outer magnets 14 could be positioned at any one or all of the available slide positions 16.

An inner magnet 18 is mounted or releasably mountable into the interior cavity 20 of inner slide 12. For example, inner magnet 18 may, be use of fork 22, be mounted closely adjacent to a position of the tublar wall of inner slide 12 corresponding to the position on the tabular wall of outer slide 10 at which are mounted outer magnets 14. Thus as outer slide 10 is slid along inner slide 12, inner magnet 18 is aligned with one of the longitudinally spaced apart array of outer magnets 14. As an outer magnet 14 aligns with inner magnet 18, the interaction of their magnetic fields provides a tactile feedback or cue, which may feel like a slight tug or resistance to sliding, so that the student is made aware of a slide position at that relative positioning between outer slide 10 and inner slide 12.

Figure 3:
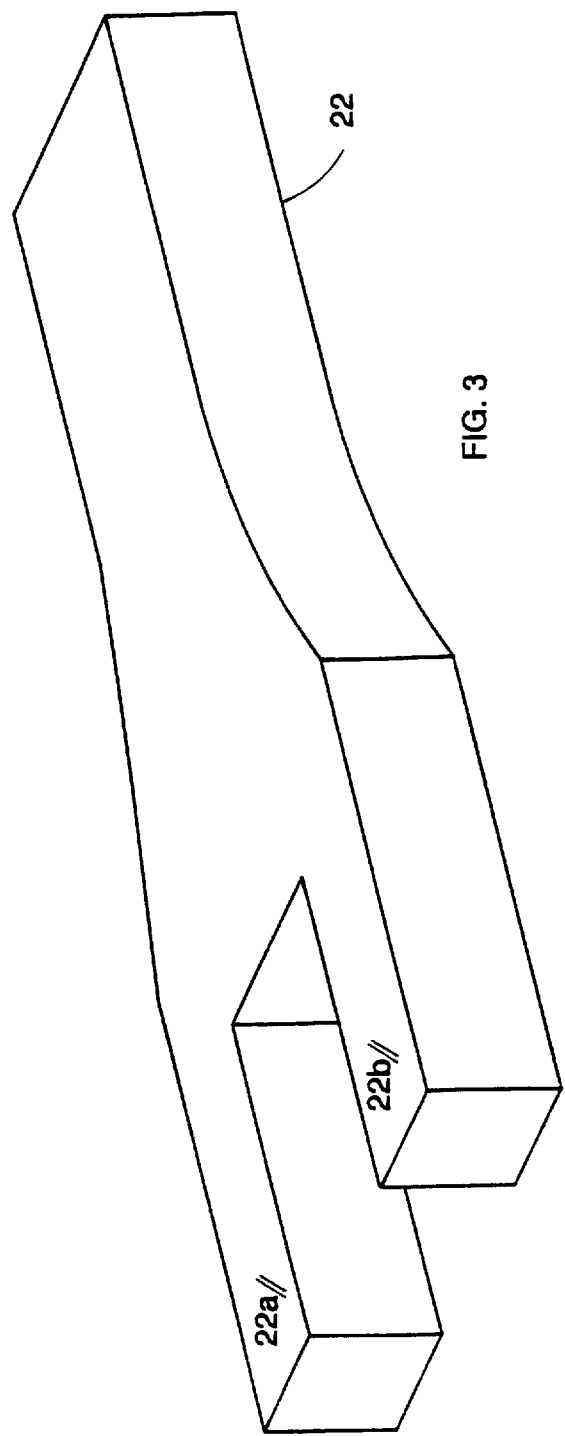
FIG. 3 is, in perspective view, the position marker mounting means of FIG. 2.
Figure 4:
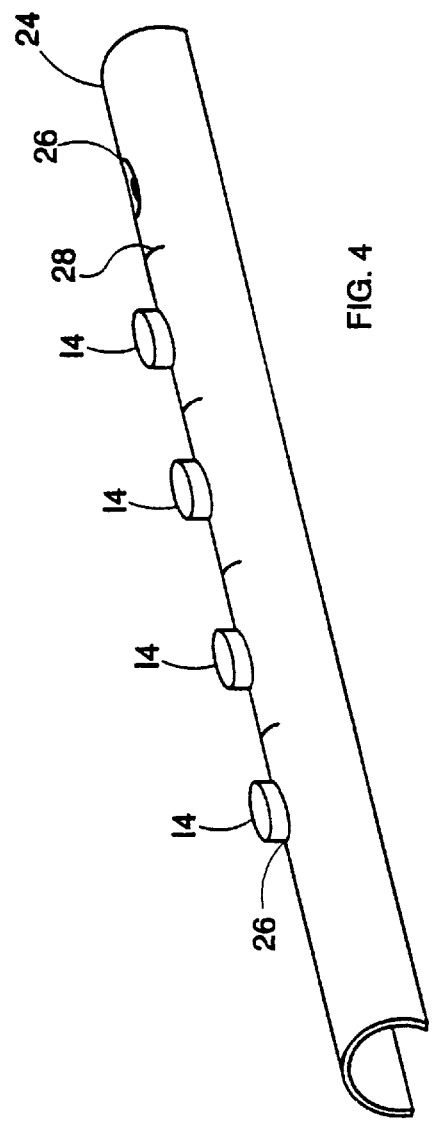
FIG. 4 is, in perspective view, the sleeve magnet holder of FIG. 1.

In one preferred embodiment, inner magnet 18 is rectangular and is secured within cavity 20 of inner slide 12 by means of a clip such as double pronged fork 22, better seen in FIG. 3. Magnet 18 is held between the 22a and 22b prongs of fork 22. Fork 22 is inserted in direction A into snug releasable sliding engagement within cavity 20. Outer magnets 14 may be secured to outer slide 10 by means of a slide protector sleeve 24, better seen in FIG. 4, which may be made of plastic and into which may be formed depressions 26 for securement, as by gluing, of outer magnets 14 into the depressions. The slide protector sleeve may have incremental markings 28 or otherwise means to assist a teacher incrementally cutting off, or cutting away, lengths of the ends of the sleeve so as to reduce the number of magnets on the outer slide as a student progresses.

In one preferred embodiment, outer magnets 14 and inner magnet 18 may be 10,800 gaus, but preferably are 12,300 or greater gaus, magnets measuring ⅜ by 0.1 inches. The corners of inner magnet 18 may be rounded, as for example by grinding, to better fit the curvature of the inner walls of cavity 20 so that inner magnet 18 may be mounted in close adjacency to a corresponding outer magnet 14.

If it is desired to increase the magnitude of the tactile feedback or cue, single outer magnets 14 and inner magnet 18 may be replaced with two or more magnets at each location.

Advantageously, inner magnet 18 or outer magnets 14 may be nickel-plated for corrosion resistance.

In an alternative embodiment, as seen in FIG. 5, outside magnets 14 may be replaced by a longitudinally spaced apart array of magnetic reed switches 30 cooperating with a corresponding longitudinally spaced apart array of light emitting diodes 32 mounted at slide positions 16, for example by means of mounting on sleeve 24. As outer slide 10 is slid over inner slide 12, inner magnet 18 trips one of the array of magnetic reed switches, thereby illuminating the corresponding light emitting diode, thereby replacing or enhancing the tactile feedback with a visual feedback or cue.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for marking slide positions on a trombone having an inner hollow slide slidingly journalled in an outer hollow slide comprising magnet sensing means mountable on said outer hollow slide for sensing proximity of a first magnet mounted within said inner hollow slide, said magnet sensing means mountable in longitudinally spaced apart slide positions on said outer hollow slide, said first magnet mountable within said inner hollow slide so as to indicate said proximity of said first magnet to said magnet sensing means by feedback to a user sliding said outer hollow slide over said inner hollow slide, wherein said magnet sensing means are second magnets electrically cooperating with light emitters to provide said feedback.

2. An apparatus for marking slide positions on a trombone having an inner hollow slide slidingly journalled in an outer hollow slide comprising magnet sensing means mountable on said outer hollow slide for sensing proximity of a first magnet mounted within said inner hollow slide, said magnet sensing means mountable in longitudinally spaced apart slide positions on said outer hollow slide, said first magnet mountable within said inner hollow slide so as to indicate said proximity of said first magnet to said magnet sensing means by feedback to a user sliding said outer hollow slide over said inner hollow slide, wherein said magnet sensing means are magnetic reed switches electrically cooperating with light emitters to provide said feedback.

3. The apparatus of claim 1 wherein said light emitters are light emitting diodes.

4. The apparatus of claim 2 wherein said light emitters are light emitting diodes.

5. An apparatus for marking slide positions on a trombone having an inner hollow slide slidingly journalled in an outer hollow slide comprising magnet sensing means mountable on said outer hollow slide for sensing proximity of a first magnet mounted within said inner hollow slide, said magnet sensing means mountable in longitudinally spaced apart slide positions on said outer hollow slide, said first magnet mountable within said inner hollow slide so as to indicate said proximity of said first magnet to said magnet sensing means by feedback to a user sliding said outer hollow slide over said inner hollow slide, wherein said magnet sensing means are second magnets and wherein said feedback is tactile.

6. An apparatus for marking slide positions on a trombone having an inner hollow slide slidingly journalled in an outer hollow slide comprising magnet sensing means mountable on said outer hollow slide for sensing proximity of a first magnet mounted within said inner hollow slide, said magnet sensing means mountable in longitudinally spaced apart slide positions on said outer hollow slide, said first magnet mountable within said inner hollow slide so as to indicate said proximity of said first magnet to said magnet sensing means by feedback to a user sliding said outer hollow slide over said inner hollow slide, wherein said magnet sensing means is a longitudinally spaced apart array of second magnets mountable onto said outer hollow slide by a sleeve, said array of second magnets mountable onto said sleeve, and wherein said magnet mountable within said inner hollow slide is releasably secured by a clip.

7. The apparatus of claim 6 wherein said clip is a double pronged fork, sized so that said magnet is snugly mountable in a friction fit between prongs of said double pronged fork.

8. A method of marking slide positions on a trombone having an inner hollow slide slidingly journalled in an outer hollow slide comprising the steps of:

a) mounting, in longitudinally spaced apart slide positions on said outer hollow slide, magnet sensing means for sensing proximity of a magnet mounted within said inner hollow slide, b) mounting a magnet within said inner hollow slide, c) positioning said magnet so as to register said proximity of said magnet to said magnet sensing means by feedback to a user sliding said outer hollow slide over said inner hollow slide.

\* \* \* \* \*